(12) United States Patent
Li et al.

(10) Patent No.: US 8,608,880 B1
(45) Date of Patent: Dec. 17, 2013

(54) METHOD FOR RECLAIMING TNT AND TNT-BASE HIGH EXPLOSIVE FROM WARHEAD BY STRIP DOWN IN SUPERCRITICAL FLUID

(71) Applicant: Tai Cham Technology Co. Ltd., Changhua (TW)

(72) Inventors: Jin-Shuh Li, Changhua (TW); Taso-Fa Yeh, Chanaghua (TW); Kai-Tai Lu, Changhua (TW); Yung-Ho Chiu, Changhua (TW); Shou-Hsiu Chen, Changhua (TW)

(73) Assignee: Tai Cham Technology Co. Ltd., Fenyuan, Changhua (TW)

( * ) Notice: Subject to any disclaimer, the term of this patent is extended or adjusted under 35 U.S.C. 154(b) by 0 days.

(21) Appl. No.: 13/788,104

(22) Filed: Mar. 7, 2013

Related U.S. Application Data

(63) Continuation-in-part of application No. 13/182,583, filed on Jul. 14, 2011, now abandoned.

(51) Int. Cl.
C06B 25/00 (2006.01)
C06B 25/04 (2006.01)
C06B 25/06 (2006.01)
D03D 23/00 (2006.01)
D03D 43/00 (2006.01)

(52) U.S. Cl.
USPC .......... 149/109.6; 149/88; 149/105; 149/106; 149/108.4

(58) Field of Classification Search
USPC ...................... 149/88, 105, 106, 108.4, 109.6
See application file for complete search history.

(56) References Cited

U.S. PATENT DOCUMENTS 5,953,679 A * 9/1999 Morris .......................... 210/808

* cited by examiner

*Primary Examiner* — James McDonough
(74) *Attorney, Agent, or Firm* — Jackson IPG PLLC

(57) ABSTRACT

A method for the retraction of an explosive component from a high explosive, including the steps of loading a high explosive containing an explosive component into an striping down vessel; supplying a supercritical fluid to the striping down vessel; contacting the high explosive with the supercritical fluid at a temperature below the melting point of the explosive component and at a pressure sufficient to strip down the explosive component; and inducing a sonicating process on the striping down vessel simultaneously at a frequency of 2 MHz to 10 MHz.

13 Claims, 3 Drawing Sheets

```
┌─────────────────────────────────────────┐
│ securing a warhead encased therein a high│
│ explosive in a strip-down vessel         │
└─────────────────────────────────────────┘
                    │
                    ▼
┌─────────────────────────────────────────┐
│ supplying a supercritical fluid to the   │
│   strip-down vessel                      │
└─────────────────────────────────────────┘
                    │
                    ▼
┌─────────────────────────────────────────┐
│ Contacting the high explosive with the   │
│  supercritical fluid at a temperature lower│
│ than the melting point temperature of high│
│ explosive and at a pressure sufficient to│
│  strip down high explosive, and inducing │
│ a sonicating process simultaneously      │
└─────────────────────────────────────────┘
```

FIG.1

METHOD FOR RECLAIMING TNT AND TNT-BASE HIGH EXPLOSIVE FROM WARHEAD BY STRIP DOWN IN SUPERCRITICAL FLUID

CROSS-REFERENCE TO RELATED APPLICATIONS

This application is a continuation in part of U.S. patent Ser. No. 13/182,583 entitled "METHOD FOR RECLAIMING HIGH EXPLOSIVE FROM WARHEAD BY MELTING-OUT IN SUPERCRITICAL FLUID" filed Jul. 14, 2011 which is incorporated by reference for all purposes, and is now pending.

BACKGROUND OF THE INVENTION

1. Field of the Invention

The invention relates to methods for recovery and separation of high explosive from aged munitions and more particularly to a method for reclaiming a high explosive from warhead by striping down at a temperature below the melting point in supercritical fluid and inducing a sonicating process simultaneously.

2. Description of Related Art

How to effectively remove obsolete and aged munitions and explosive inventories from the active arsenal in a safe manner is of great concern. Typically, demilitarization programs focused on disposal or destruction. Recently, there have been efforts to develop recycling and/or reclamation processes that permit explosives and higher valued constituents of munitions systems to be recovered and re-used in military applications due to environmental protection.

Typical methods for demilitarization separation techniques include melting out, steaming/water washout and solvent washout of the high explosive from the projectile casing. Typical methods for melting out and steaming/water washout are operation at a temperature above the melt point and take high explosive phase transition from solid to liquid. Solvent washout is solution high explosive to be separated. These three methods are disadvantageous for being time consuming, inappropriate for mass reclamation of explosive, generating too much polluted waste water which is required to treat in prohibitively high cost, and being low efficiency.

U.S. Pat. No. 5,953,679 to Morris discloses a method for the extraction of TNT from a high explosive comprising contacting the high explosive with a supercritical fluid at a temperature above the melting temperature (e.g., 85 degrees Celsius) of TNT and at a pressure (e.g., 37.4 MPa) sufficient to extract the TNT.

This patent is part of extraction method. In detail, specific substance of the mixture moves from one solvent to another solvent due to different solubilities of different solvents. In example 1, solubilities of TNT and RDX in a supercritical carbon dioxide solvent are illustrated. In examples 2 and 3, how to extract TNT from explosive B is illustrated. In example 4, explosive is first molten out of a shell by subjecting the shell to carbon dioxide in a temperature of 85 degrees Celsius which is higher than the melting temperature of 81 degrees Celsius of the explosive. Next, an extraction is performed for increasing efficiency. In these examples, melting TNT out of a shell by subjecting the shell to carbon dioxide in a temperature higher than the melting point of TNT is a technique within the ordinary skilled artisan in the art and is deemed obvious. Thus, it is very possible that unexpected explosions may occur during the melting-out vessel. This is very dangerous.

Further, in claim 1 of the patent melting TNT out of a shell by subjecting the shell to carbon dioxide in a temperature higher than the melting point of TNT. TNT will melt out of any contained enclosure when subjecting to an environment in a temperature higher than the melting point of TNT. This is within the ordinary skilled artisan in the art and is deemed obvious. Melting point means the temperature at which the solid and liquid phases of a substance are in equilibrium. Thus, it is normal when a substance is molten when it is subjected to an environment having a temperature higher than its melting point. But, special attention should be paid when a substance is molten in a temperature lower than its melting point. In short, the patent is characterized in that the molten TNT is extracted out of a shell by utilizing TNT having a solubility greater than other explosives when subjecting to a supercritical carbon dioxide environment.

It is also known that many explosive components have a very low solubility in carbon dioxide based supercritical fluid. Further, TNT has a very low solubility in carbon dioxide based supercritical fluid. Thus, a great volume of carbon dioxide based supercritical fluid is required for reclaiming TNT from the high explosive. This in turn adversely increases the cost. For example U.S. Pat. No. 5,953,679 to Morris discloses solubility of TNT in supercritical carbon dioxide gas of temperature 65 degrees Celsius and pressure 27.6 MPa is 16 mg/mL. 412.5 liter of supercritical carbon dioxide liquid is used to extract 6,600 gram of TNT from a warhead of a 155 mm gun-howitzer in supercritical carbon dioxide gas of temperature 65 degrees Celsius and pressure 27.6 MPa. The extraction vessel has a capacity of 415 liter and is high of the manufacturing cost. Alternatively, it will take 190 days in a flow rate of 1.5 ml/minute to extract 6,600 gram of TNT from a warhead of a 155 mm gun-howitzer in supercritical carbon dioxide gas of temperature 65 degrees Celsius and pressure 27.6 MPa.

Notwithstanding the prior art, the invention is neither taught nor rendered obvious thereby.

SUMMARY OF THE INVENTION

It is therefore one object of the invention to provide a method for the retraction of an explosive component from a high explosive, comprising the steps of loading a high explosive containing an explosive component into a striping down vessel; supplying a supercritical fluid to the striping down vessel; contacting the high explosive with the supercritical fluid at a temperature below the melting point of the explosive component and at a pressure sufficient to strip down the explosive component; inducing a sonicating process simultaneously to have the high explosive accelerated to strip down from the warhead; and simultaneously adding an ultrasonic process to accelerate the high explosive to strip down from the warhead. That is, the high explosive is only molten when it strips down from the warhead and further strips down from the vessel. Therefore, the invention is advantageous for being short in processing time, low in temperature, and safe.

In a first aspect of the invention, the explosive component is at least one of TNT and TNT-based high explosive.

In a second aspect of the invention, the TNT-based high explosive is selected from the group consisting of Comp B, Amatol, Octol, and Ammonal.

In a third aspect of the invention, the processing temperature is between about 35 and 75 degrees Celsius and the pressure are between about 10 and 50 MPa.

In a fourth aspect of the invention, the temperature is about 55 degrees Celsius and the pressure is about 25 MPa in optimum conditions.

In a fifth aspect of the invention, the explosive component strip down from the warhead has at least 99%. In a sixth aspect of the invention, the sonicator attaching to the striping down vessel increases efficiency of the striping down process, the frequency of the sonicating process is between about 2 MHz to 10 MHz.

In a seventh aspect of the invention, the frequency of the sonicating process about 4 MHz is in optimum conditions.

In an eighth aspect of the invention, inducing a sonicating process simultaneously to speed up the efficiency of the strip down process.

By utilizing the invention, the following advantages and benefits are obtained: Safety because the carbon dioxide as a supercritical fluid is employed at a temperature less than the melting point of TNT. Be an environmentally friendly method because no organic solvent is used for collection purpose. Carbon dioxide can be substantially completely recycled after the strip down. Hence, no pollution is generated. Cost effectiveness because the method is time saving and batch based. The TNT strip down is done in a melting state, resulting in an increase of the percentage of TNT being striped down. Further, simultaneously an ultrasonic process is added to accelerate the high explosive to strip down from the warhead. That is, the high explosive is only molten when it strips down from the warhead and further strips down from the vessel. Therefore, the invention is advantageous for being short in processing time, low in temperature, and safe.

The above and other objects, features and advantages of the invention will become apparent from the following detailed description taken with the accompanying drawings.

BRIEF DESCRIPTION OF THE DRAWINGS

FIG. 1 is a flow chart illustrating a view of a method for reclaiming high explosive from warhead by striping down in supercritical fluid according to the invention;

DETAILED DESCRIPTION OF THE INVENTION

Temperature and pressure at the critical-point are defined as the critical temperature ($T_C$) and critical pressure ($P_C$). The critical parameters for carbon dioxide are Tc first 31 degrees Celsius and Pc first 7.39 MPa. A supercritical fluid results when the temperatures and pressures of the materials are greater than their critical parameters. For effective strip down of high explosive, operation is done by attaching a sonicator on the vessel (see FIG. 3) and at pressure of about 25 MPa and temperature of about 55 degrees Celsius. All high explosive stripped down were carried out using a carbon dioxide based supercritical fluid in a safe and cost effective manner because the liquid carbon dioxide is non-flammable, non-toxic, chemically stable, and cost effective.

Referring to FIG. 1, a method for reclaiming high explosive from warhead by striping down in supercritical fluid in accordance with the invention is illustrated. The method comprises the steps of securing a warhead having encased therein high explosive in a striping down vessel; supplying a supercritical fluid to the striping down vessel; contacting the high explosive with the supercritical fluid at a temperature lower than the melting point temperature of the high explosive and at a pressure sufficient to strip down the high explosive, and inducing a sonicating process on the striping down vessel simultaneously at a frequency of 2 MHz to 10 MHz.

Figure 2:
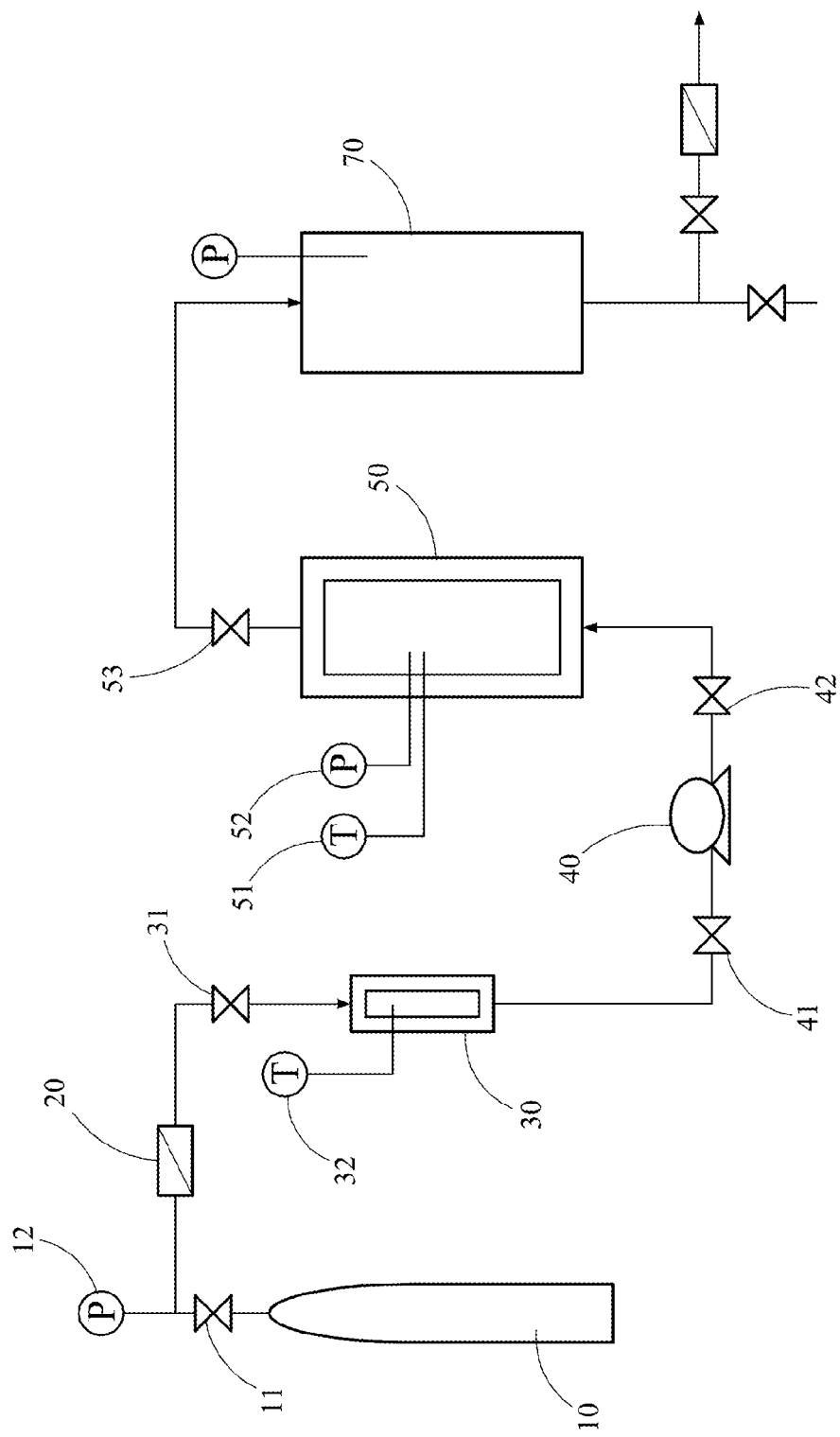
FIG. 2 schematically shows a system used in carrying out the method of the invention.

Referring to FIG. 2, a system for carrying out the method in accordance with the invention is schematically shown. In operation, liquid carbon dioxide is stored in a first storage tank 10. The liquid carbon dioxide is introduced to a filter 20 through a valve 11 by a pump 12. After being filtered by the filter 20, the pure liquid carbon dioxide passes a valve 31 into a second storage tank 30. The liquid carbon dioxide is heated to an operating temperature in the second storage tank 30 by a heater (not shown). The second storage tank 30 is provided with a thermometer 32 for measuring temperature of the liquid carbon dioxide contained therein. The heated liquid carbon dioxide is pressurized by a pump 40 prior to entering a striping down vessel 50 in the state of a supercritical fluid. At upstream and downstream of the pump 40, there are provided valves 41, 42 respectively. The provision of the valves 41, 42 can adjust the amount of liquid carbon dioxide as supercritical fluid supplied to the striping down vessel 50. The striping down vessel 50 is provided with a thermometer 51 and a pressure gauge 52 so that a person operating the system may be visually aware of the temperature and the pressure of the liquid carbon dioxide contained in the striping down vessel 50. Preferably, the temperature of the striping down vessel 50 is sufficiently low and the pressure thereof is also sufficient so that the high explosive may contact the supercritical fluid at the predetermined temperature range and at the predetermined pressure range to strip down the high explosive. The supercritical fluid may then flow to a flow restrictor 53 with the flow being reduced thereat. As the pressure drops, the liquid carbon dioxide becomes a gas at an ambient temperature, and any dissolved solute nucleates and is collected in a carbon dioxide recycling vessel 70. The expanded carbon dioxide gas flows to a subsequent station for further processing.

Figure 3:
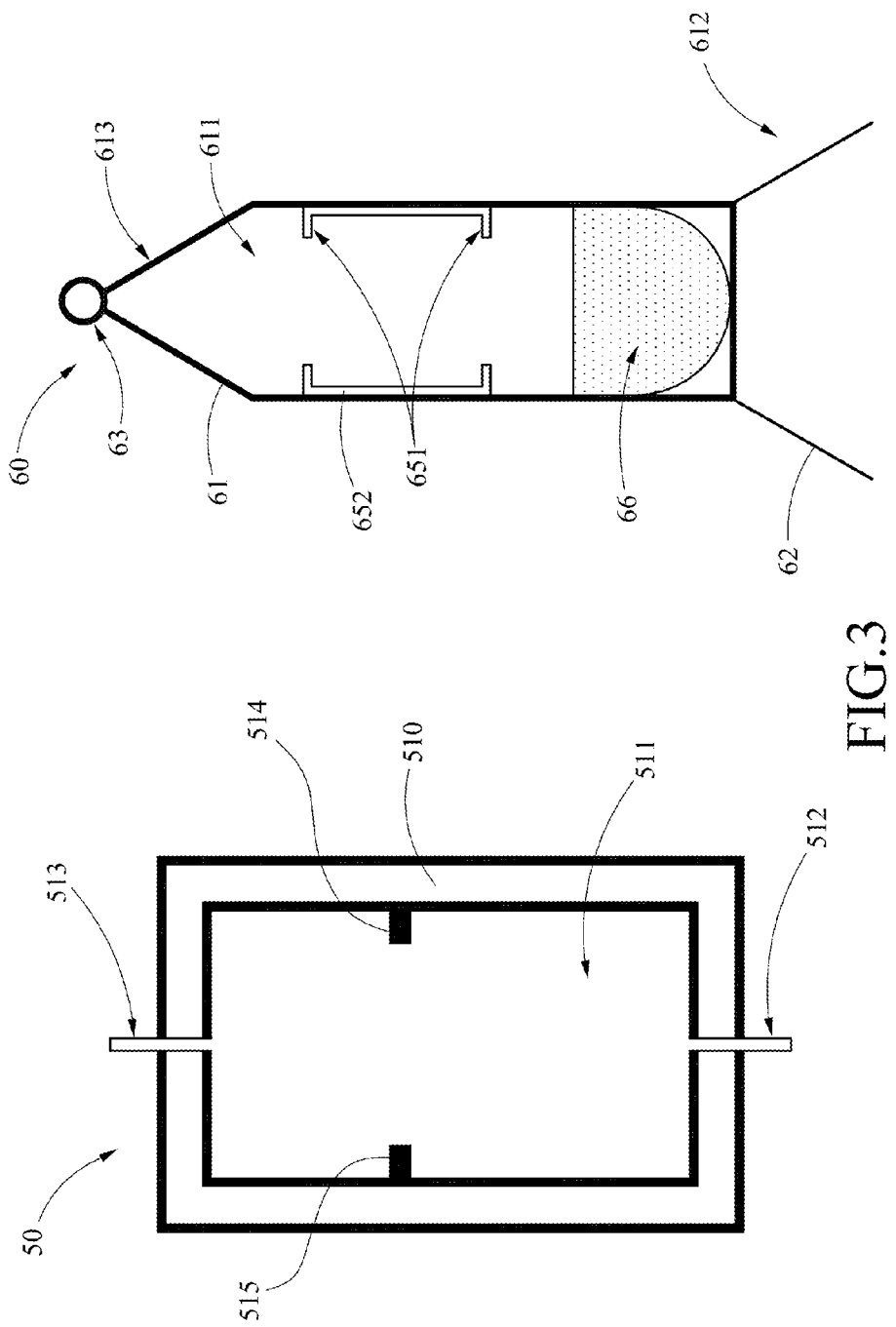
FIG. 3 schematically shows attaching a sonicator on the striping down vessel of FIG. 2 and a support for holding the striping down vessel.

Referring to FIG. 3, the striping down vessel 50 comprises a shell 510 with a temperature control layer (not shown), a space 511 defined by the shell 510, an inlet 512 through the bottom, and an outlet 513 through the top, a pair of sonicators 514, 515 attaching inside the shell 510. A support 60 is provided for holding the striping down vessel 50. The support 60 comprises a shell 61, a space 611 defined by the shell 61, an inlet 612 of the shell 61 communicating with the inlet 512 and being held by a support 62 which is placed in the striping down vessel 50, an outlet 613 communicating with the outlet 513, a hanging ring 63 proximate the outlet 613 for moving the support 60, a pair of brackets 651, 652 for positioning a warhead (not shown), and a storage member 66 under the brackets 651, 652. In operation, high explosive of the warhead may contact the liquid carbon dioxide (i.e., supercritical fluid) accompanying with sonicating process at optimum frequency, temperature, and pressure ranges. As a result, the high explosive is disengaged from or striped down and temporarily stored in the storage member 66.

Following are examples of the invention with the space 511 having a volume of two (2) liters:

Example (I) for Striping Down TNT in Low Temperature

A simulated warhead of 40 mm diameter containing 60 g TNT in an inverted position is held by a support. Place both the support and the warhead in a striping down prior to sealing. TNT begins to strip from the warhead as pressurized liquid carbon dioxide as a supercritical fluid is supplied to the striping down vessel. Percentages of the striped TNT are tabulated in the following Tables (I) and (II) as temperature and pressure vary in the strip down operation which takes about 30 minutes.

TABLE (I)

| Pressure (MPa) | Temperature (degrees Celsius) | Time (min) | % TNT striped down |
|---|---|---|---|
| 15 | 55 | 30 | 59.5 |
| 20 |  |  | 100 |
| 25 |  |  | 100 |
| 30 |  |  | 100 |
| 35 |  |  | 100 |
| 40 |  |  | 100 |

TABLE (II)

| Temperature (degrees Celsius) | Pressure (MPa) | Time (min) | % TNT striped down |
|---|---|---|---|
| 35 | 25 | 30 | 2 |
| 45 |  |  | 5 |
| 55 |  |  | 100 |
| 65 |  |  | 100 |
| 75 |  |  | 100 |

Definition: % TNT striped down operation is defined by weight of the striped TNT divided by weight of TNT before the strip down operation and multiplied by 100%.

Example (II) for Striping Down TNT in Low Temperature

A simulated warhead having a volume of 250 ml containing 250 g TNT in an inverted position is held by a support. Place both the support and the warhead in a striping down vessel prior to sealing. TNT begins to strip down from the warhead as pressurized liquid carbon dioxide as a supercritical fluid is supplied to the striping down vessel which is maintained at a temperature of about 55 degrees Celsius and at a pressure of about 25 MPa. The strip down operation takes about 30 minutes. Results: About zero (0) gram TNT is remained in the warhead and about 241 g of TNT is collected in the TNT collection vessel after the strip down operation.

Example (III) for Striping Down TNT in Low Temperature

A simulated warhead having a volume of 350 ml containing 500 g TNT in an inverted position is held by a support. Place both the support and the warhead in a striping down vessel prior to sealing. TNT begins to strip down from the warhead as pressurized liquid carbon dioxide as a supercritical fluid is supplied to the striping down vessel which is maintained at a temperature of about 55 degrees Celsius and at a pressure of about 25 MPa. The strip down operation takes about 30 minutes. Results: About zero (0) gram TNT is remained in the warhead and about 490 g of TNT is collected in the TNT collection vessel after the strip down operation.

Example (IV) for Striping Out Comp B in Low Temperature

A 105 mm howitzer warhead containing 2200 g composition B (i.e., Comp B) consisting of 60% RDX, 40% TNT, and less than 1% wax in an inverted position is held by a support. Place both the support and the warhead in a strip down vessel prior to sealing. Composition B begins to strip down from the warhead as pressurized liquid carbon dioxide as a supercritical fluid is supplied to the strip down vessel which is maintained at a temperature of about 65 degrees Celsius and at a pressure of about 25 MPa. The striping down operation takes about 120 minutes.

Example (V) for Striping Out TNT in Low Temperature

A 155 mm howitzer warhead containing 6700 g TNT in an inverted position is held by a support. Place both the support and the warhead in a strip down vessel prior to sealing. TNT begins to strip down from the warhead as pressurized liquid carbon dioxide as a supercritical fluid is supplied to the strip down vessel which is maintained at a temperature of about 65 degrees Celsius and at a pressure of about 25 MPa. The strip down operation takes about 30 minutes.

Example (VI) for Striping Out TNT in Low Temperature

A 155 mm howitzer warhead containing 6700 g TNT in an inverted position is held by a support. Place both the support and the warhead in a strip down vessel prior to sealing, simultaneously to start sonicator at the frequency of 2 MHz to 10 MHz. TNT begins to strip down from the warhead as pressurized liquid carbon dioxide as a supercritical fluid is supplied to the strip down vessel which is maintained at a temperature of about 65 degrees Celsius and at a pressure of about 25 MPa. The striping down operation takes about 20 minutes.

Example (VII) for Striping Out TNT in Low Temperature

A 155 mm howitzer warhead containing 6700 g TNT in an inverted position is held by a support. Place both the support and the warhead in a strip down vessel prior to sealing, simultaneously to start sonicator at the frequency of 2 MHz to 10 MHz. TNT begins to strip down from the warhead as pressurized liquid carbon dioxide as a supercritical fluid is supplied to the strip down vessel which is maintained at a temperature of about 35 degrees Celsius and at a pressure of about 25 MPa. The striping down operation takes about 120 minute.

While the invention has been described in terms of preferred embodiments, those skilled in the art will recognize that the invention can be practiced with modifications within the spirit and scope of the appended claims.

What is claimed is:

1. A method for the strip down of an explosive component from a high explosive, comprising the steps of:
   (a) loading a high explosive containing an explosive component into a striping down vessel;
   (b) supplying a supercritical fluid to the striping down vessel;
   (c) contacting the high explosive with the supercritical fluid at a temperature below the melting point of the explosive component and at a pressure sufficient to strip down the explosive component; and
   (d) inducing a sonicating process on the striping down vessel simultaneously at a frequency of 2 MHz to 10 MHz.

2. The method of claim 1, wherein the explosive component is at least one of TNT and TNT-based high explosive.

3. The method of claim 2, wherein the TNT-based high explosive is selected from the group consisting of Comp B, Amatol, Octol, and Ammonal.

4. The method of claim 2, wherein the supercritical fluid is liquid carbon dioxide.

5. The method of claim 2, wherein the temperature is between about 50 and 75 degrees Celsius and the pressure is between about 15 and 40 MPa.

6. The method of claim 5, wherein the temperature is about 55 degrees Celsius and the pressure is about 25 MPa.

7. The method of claim 3, wherein the explosive component is striped down from the TNT-based high explosive has at least 99% TNT.

8. The method of claim 1, wherein steps (a), (b), (c), and (d) are done by batches operation.

9. The method of claim 2, wherein the TNT is striped by a strip-down method.

10. The method of claim 2, wherein the TNT-based high explosive is striped by a strip-down method.

11. The method of claim 1, wherein the temperature of the supercritical fluid is about 55 degrees Celsius and the pressure thereof is about 25 MPa.

12. The method of claim 2, wherein the temperature of the supercritical fluid is about 55 degrees Celsius and the pressure thereof is about 25 MPa.

13. The method of claim 1, wherein the frequency of the sonicating process is 4 MHz.

* * * * *